United States Patent [19]

Whinray et al.

[11] Patent Number: 4,680,723
[45] Date of Patent: Jul. 14, 1987

[54] SIGNAL PROCESSOR FOR MATRIX ARRAYS

[75] Inventors: David T. Whinray; Gwilym J. Tilsley, both of Hatfield, England

[73] Assignee: British Aerospace PLC, London, England

[21] Appl. No.: 659,957

[22] Filed: Oct. 11, 1984

[30] Foreign Application Priority Data

Oct. 14, 1983 [GB] United Kingdom ............... 8327594

[51] Int. Cl.$^4$ .............................................. G01T 1/20
[52] U.S. Cl. ...................................... 364/571; 250/332
[58] Field of Search ...................... 364/571, 550, 551; 250/332, 339

[56] References Cited

U.S. PATENT DOCUMENTS

| | | | |
|---|---|---|---|
| 4,072,863 | 2/1978 | Roundy | 250/332 |
| 4,323,977 | 4/1982 | Arseneau | 364/571 |
| 4,419,692 | 12/1983 | Modisette et al. | 250/332 X |
| 4,499,547 | 2/1985 | Inuiya et al. | 364/571 |
| 4,573,133 | 2/1986 | White | 364/571 |

Primary Examiner—Errol A. Krass
Assistant Examiner—H. R. Herndon
Attorney, Agent, or Firm—Cushman, Darby & Cushman

[57] ABSTRACT

Matrix arrays, in particular infra-red arrays, suffer from non-uniformity in output from the individual elements in the array. This is due to each element in the array having for example, its own characteristic responsivity and leakage current, and is seen in the array output as a pattern of offset values. These offset values must be removed from the output of the array if useful digital information is to be obtained. One known method of doing this is to show the array a black body at a known uniform temperature and use the output from the array to cancel the offset values. However, the dynamic range of the system is directly related to the range of offset values obtained and also to the size of the digitizer. Large-size digitizers have relatively slow sampling rates and in order to have a higher sampling rate, a small-size digitizer must be used. The signal processing system described herein corrects for offset values and is able to provide a high sampling rate by using a small-size digitizer.

5 Claims, 1 Drawing Figure

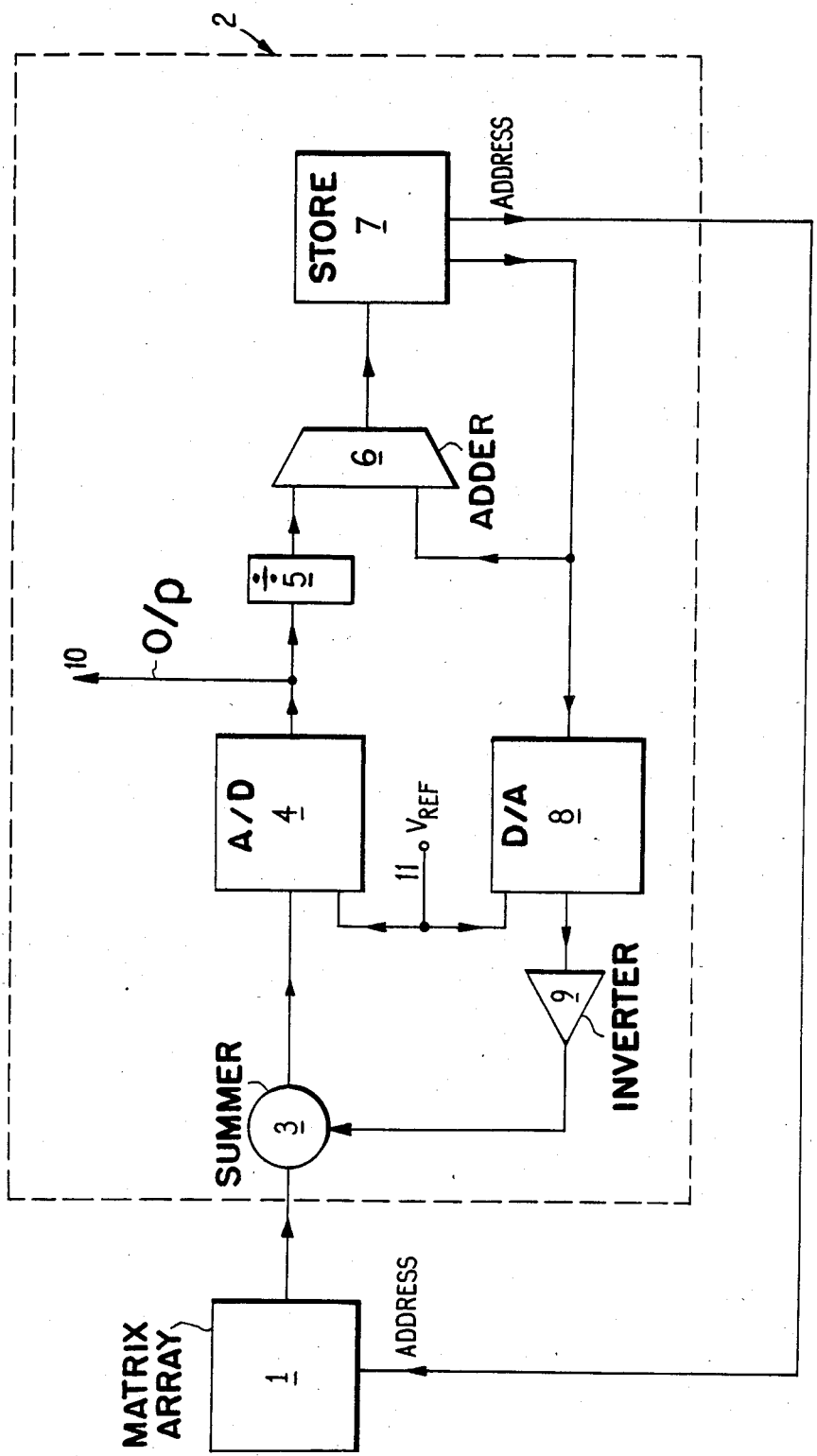

4,680,723

SIGNAL PROCESSOR FOR MATRIX ARRAYS

BACKGROUND OF THE INVENTION

This invention relates to signal processor systems providing a digital output for use in the correction of non-uniformities in the output of matrix arrays. It is particularly, but not necessarily exclusively, suitable for use with infra-red arrays.

In general, matrix arrays suffer from non-uniformity in output from the individual elements of the matrix array. This is caused by each element of the matrix array having for example, its own characteristic responsivity and leakage current, and is seen in the matrix array output as a pattern of offset values. These offset values may be 2000 times the random noise output of the array.

In order to obtain useful digital information from a matrix array, the offset values must be removed from the output. A method of doing this is to show the array a black body of a given uniform temperature; the output from the array can then be used to cancel the offset values obtained during subsequent use. A problem with this method, in addition to having to use a static reference source, is that the dynamic range of the system is directly related to the range of offset values obtained and the size of the digitiser. With existing large-size digitisers, the sampling rate is relatively slow, and where a higher sampling rate is necessary, a small-size digitiser must be provided. For example a sampling rate of 1 MHz can only be presently obtained by an 8-bit digitiser.

It is therefore an object of this invention to provide a signal processing system in which the dynamic range of the system is not significantly prejudiced by the use of a small-size digitiser.

SUMMARY OF THE INVENTION

According the present invention, there is provided a signal processing system, for use with a matrix array in which the individual, addressed elements have differing characteristics resulting in each element having an offset value producing non-uniformity in the output of the array, including an N-bit analog-to-digital converting means for accepting successive analog input signals during processing, adding means, and storage means, the adding means being arranged to sum a digital output from the analog-to-digital converting means and an output from the storage means, the summed value being passed into the storage means, an M-bit digital-to-analog converting means, where M>N, for converting the output from the storage means to an analog signal which is subsequently summed with the input via inverting means, whereby successive inputs from an addressed element are summed and fed back for subtraction from the input prior to the analog-to-digital converting means so that the output from each addressed element can be processed to effect cancellation of the respective offset values.

Preferably, dividing means are provided between the analog-to-digital converting means and the adding means. The dividing means can be fixed or variable. Irrespectively, they provide an integration time constant so that a predetermined decay rate is provided.

BRIEF DESCRIPTION OF THE DRAWINGS

For a better understanding of the invention, reference will now be made, by way of example, to the accompanying drawing which is a block diagram of a signal processing system connected to a matrix array.

DESCRIPTION OF THE PREFERRED EMBODIMENT

In the FIGURE, a matrix array 1 comprising a series of elements sensitive to infra-red radiation, is connected to a processing system shown generally at 2. For ease of description, the processing of the signal from one element of the array 1 will now be described. Naturally, the signals from successive elements are similiarly processed.

The output signal from an element is passed via a summing device 3 to an analog-to-digital converter 4 of N-bits, typically 8, from which the digital signal is passed via a binary divider 5 to an adder 6. The output from the adder 6 is passed to a store 7 which itself is interconnected for address purposes to the array 1. A further output from the store 7 is passed to the adder 6, and is also simultaneously passed to a digital-to-analog converter 8 of M-bits (where M>N), typically 12-bits. The output from the digital-to-analog converter 8 is passed via an inverting amplifier 9 to the summing device 3. A direct digital output is obtained at 10. A reference signal is applied to the analog-to-digital converter 4 and to the digital-to-analog converter 8 at 11.

Assuming an element of the array 1 is addressed and passes a signal of 900 units into the processor 2, only 256 units can be accepted by the analog-to-digital converter 4. A signal corresponding to 256 is then divided by 1 (for stabilisation purposes) at item 5 and is passed to the adder 6 where it is added to the signal received from the store 7. The store 7 is initially set at 0 and hence the signal passed from the adder to the store 7 corresponds to 256 replacing the previous value in the store 7.

The element is again addressed and a further 900 signal is passed into the processor 2 where it is summed at 3 with the previously stored value 256 producing a new input to the analog-to-digital converter 4 of 644. This process is repeated until the stored value for that element is 900 which produces an output at 10 of 0, having cancelled the offset value for that element.

Once the offset value for each element of the array has been determined and stored in the store 7, then information obtained during subsequent detection of a scene by the array can be output directly at 10 with the offset cancelled.

The system may be refined by varying the gain of the inverting amplifier 9 ($-2^{M-N}$) and/or by providing a variable divider at 5 which divides by $2^x$ where x is equal to or greater than 1.

The invention is thought to have greatest advantage in infra-red systems, but it can be used in other optical systems. It has particular advantage when a continually varying scene is to be detected since the fixed calibration source, e.g. the black body, of previous systems is not required.

As previously discussed, if the divider 5 is caused to divide the analog-to-digital converter 4 output by some power of 2, the integration time constant is increased so that the system yields a constantly updated set of offset values in the store 7, thus providing correction over a wide variation of scene temperatures with time.

What is claimed:

1. A signal processing system for applying offsets to analog input signals received one after another from a plurality of signal forming elements to compensate for any differences in the characteristics of the different elements, the system comprising:

- subtracting means having a first input for receiving said analog input signals and having a second input for receiving further analog signals for forming difference signals dependent upon said input signals minus values dependent upon said further analog signals;
- N-bit analog to digital converter means connected to the subtracting means for forming N-bit digital signals representative of successive samples of said difference signals;
- digital signal adding means having two inputs and an output, one of said two inputs being connected to the analog to digital converter means for receiving said N-bit digital signals and the adding means supplying at its output the sum values of signals applied to its two inputs;
- store means connected to the output and the other of said two inputs of the adding means, the store means having a plurality of storage locations corresponding to respective ones of said signal forming elements for storing at said locations respective sum values received from the output of the adding means and also for supplying the stored sum values to said other input of the adding means to initiate the formation of new sum values by the adding means; and
- M-bit digital to analog converter means connected to said store means and said second input of the substracting means for receiving M-bit digital sum values read from the storage locations of the store means and for converting them to form said further analog signals, the number of bits M being greater than N.

2. A system according to claim 1, wherein dividing means are included between the analog-to-digital converting means and the adding means to provide an integration time constant which determines the decay rate of the system.

3. A system according to claim 2, wherein the dividing means has a fixed value.

4. A system according to claim 2, wherein the dividing means has a variable value.

5. A system according to claim 1, wherein N has the value of 8 and M has the value of 12.

* * * * *